US010727978B2

(12) United States Patent
Gebhard et al.

(10) Patent No.: US 10,727,978 B2
(45) Date of Patent: Jul. 28, 2020

(54) METHOD AND APPARATUS FOR TRANSMITTING CONTROL MESSAGES IN AN OPTICAL TRANSMISSION NETWORK (71) Applicant: Alcatel Lucent, Boulogne Billancourt (FR)

(72) Inventors: Ulrich Gebhard, Stuttgart (DE); Laurent Schmalen, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/762,306

(22) PCT Filed: Oct. 10, 2016

(86) PCT No.: PCT/EP2016/074173
§ 371 (c)(1),
(2) Date: Mar. 22, 2018

(87) PCT Pub. No.: WO2017/067807
PCT Pub. Date: Apr. 27, 2017

(65) Prior Publication Data
US 2018/0278367 A1 Sep. 27, 2018

(30) Foreign Application Priority Data
Oct. 22, 2015 (EP) .................... 15306699

(51) Int. Cl.
*H04L 1/00* (2006.01)
*H04L 12/715* (2013.01)
(Continued)

(52) U.S. Cl.
CPC .......... *H04L 1/0045* (2013.01); *H04B 10/27* (2013.01); *H04L 1/0072* (2013.01);
(Continued)

(58) Field of Classification Search
CPC ....... H04L 1/0045; H04L 47/35; H04L 45/04; H04L 1/0083; H04L 1/0072; H04L 1/0079; H04B 10/27; H04Q 2011/0088
See application file for complete search history.

(56) References Cited

U.S. PATENT DOCUMENTS 8,614,961 B1    12/2013  Katar et al.
2002/0041570 A1*  4/2002  Ptasinski ............... H04L 1/0003
                                                          370/252
(Continued)

FOREIGN PATENT DOCUMENTS

CN    104363531 A    2/2015
EP    1094683        4/2001
(Continued)

OTHER PUBLICATIONS

Kazuo Kubo, et al., A Study on Power-scaling of Triple-concatenated FEC for OTN, IEICE technical report, vol. 116, No. 112, Japan, The Institute of Electronics, Information and Communication Engineers, Jun. 16, 2015, vol. 116.
(Continued)

*Primary Examiner* — Thien Nguyen
(74) *Attorney, Agent, or Firm* — McCracken & Gillen LLC (57) ABSTRACT A technique is provided for providing control messages to one or more nodes included in an optical transmission network. The technique includes receiving, at a node, a container comprising a container header and a container payload portion. The container header comprises information regarding a destination node of the container, and the container payload portion includes one or more data portions comprising information associated with one or more client data packets and a control data portion. The control data portion is associated with one or more control messages and a forward error correction (FEC) information to protect the
(Continued)

one or more control messages against transmission errors. The control data portion is decoded taking into account the FEC information. The one or more control messages included in the decoded control data portion are provided at the node.

20 Claims, 4 Drawing Sheets (51) Int. Cl.
H04B 10/27 (2013.01)
H04L 12/801 (2013.01)
H04Q 11/00 (2006.01)

(52) U.S. Cl.
CPC .......... *H04L 1/0079* (2013.01); *H04L 1/0083* (2013.01); *H04L 45/04* (2013.01); *H04L 47/35* (2013.01); *H04Q 2011/0088* (2013.01)

(56) References Cited

U.S. PATENT DOCUMENTS

| | | | |
|---|---|---|---|
| 2005/0191054 A1* | 9/2005 | Aoki | H04J 14/0204 398/45 |
| 2006/0080707 A1* | 4/2006 | Laksono | H04L 12/2805 725/38 |
| 2011/0142437 A1 | 6/2011 | Luo et al. | |
| 2014/0169791 A1* | 6/2014 | Swinkels | H04J 14/0269 398/58 |
| 2014/0181616 A1 | 6/2014 | Arunarthi | |
| 2015/0063355 A1 | 3/2015 | Makhervaks et al. | |
| 2015/0092776 A1* | 4/2015 | Wijnands | H04L 45/36 370/392 |
| 2015/0222644 A1* | 8/2015 | Szydlo | H04L 41/0813 726/22 |
| 2017/0019164 A1* | 1/2017 | Sonobe | H04W 4/06 |

FOREIGN PATENT DOCUMENTS

| | | |
|---|---|---|
| JP | 2012124595 A | 6/2012 |
| JP | 2013514683 A | 4/2013 |
| JP | 2014165924 A | 9/2014 |

OTHER PUBLICATIONS

Office Action in related Japanese Application No. 2018-520598, dated Dec. 24, 2019, 1 page.
Office Action in related Japanese Application No. 2018-520598, dated May 14, 2019, 8 pages and translation.
Notice of Final Rejection in related Korean Application No. 10-2018-7013592, dated Feb. 4, 2020, 2 pages.
Partial European Search Report in related EP Application No. 15306699.8, dated Mar. 23, 2016, 6 pages.
Extended European Search Report in related EP Application No. 15306699.8, dated Jun. 23, 2016, 14 pages.
Communication Pursuant to Article 94(3) EPC in related EP Application No. 15306699.8, dated Feb. 11, 2020, 6 pages.
Office Action in related Chinese Application No. 201680061719.3, dated Apr. 13, 2020, including English translation (downloaded from Global Dossier), 12 pages.
Search Report in related Chinese Application No. 201680061719.3, dated Apr. 2, 2020, including English translation (downloaded from Global Dossier), 3 pages.

* cited by examiner

METHOD AND APPARATUS FOR TRANSMITTING CONTROL MESSAGES IN AN OPTICAL TRANSMISSION NETWORK

The present document relates to optical data transmission systems. In particular, the present document relates to a method for providing control messages in an optical transmission system by transmitting control data portions within a payload portion of a container, and a corresponding apparatus.

Optical transmission systems, for example Metro-Ethernet transport systems, comprise a plurality of geographically distributed nodes, said nodes including one or more network elements. In said Metro-Ethernet transport systems, Ethernet packets are arranged in containers and transmitted in an aggregated way through the optical transmission network. Such geographically distributed network elements require a control/management channel for configuration and operational control. Elements of the optical transmission network cannot rely on an external network for this purpose, but must provide this control channel in-band by their own means.

The present disclosure therefore proposes a method and an apparatus which provide a reliable and efficient transmission of control messages in an optical transmission network.

According to a first aspect, a method for providing control messages to one or more nodes included in an optical transmission network is disclosed. A control message is propagated by transmitting containers between said nodes. Each container comprises a container header and a container payload portion. The container header comprises information regarding a destination node of the container, i.e. the container is destined to a specific node within the optical transmission network in order to transmit payload data to said node. The container payload portion includes one or more data portions comprising information associated with one or more client data packets. For example, the one or more client data packets may be included in the one or more data portions. Said client data packets are transmitted to the destination address of the container. For example, the client data packets may be Ethernet packets or IP packets and the IP address of said packets may be associated with a client data entity coupled with the destination node of the container. In other words, client data packets destined to client data entities coupled with the destination node are aggregated in a container and transmitted to the destination node of the optical transmission network. Once received at the destination node, the client data packets are forwarded to their respective client data entities as indicted by their respective address information (e.g. IP address). The method comprises the following steps:

At a certain node of the optical transmission network, a container may be received. The container comprises a container payload portion including one or more data portions and a control data portion. The data portion may include client data packets to be transmitted to the destination node of the container and forward error correction (FEC) information in order to protect the one or more client data packets against transmission errors. Furthermore, the container comprises a control data portion associated with one or more control messages and forward error correction (FEC) information in order to protect the one or more control messages against transmission errors. For example, the one or more control messages may be included in the control data portion. In other words, the control data portion includes control information which has to be transmitted to one or more nodes in order to perform control operations. For example, such control operation may be a hello-message, a keep-alive message etc.

Due to the FEC encoding, the control data portion is decoded based on the FEC information associated with the control data portion, i.e. by taking into account the redundant FEC information for error detection and correction. Thereby, transmission errors can be detected and remedied.

After said decoding of the control data portion, the control message(s) included in the decoded control data portion is/are provided at said node, e.g. via an interface.

Preferably, the node may comprise a processing unit for processing said control message(s). For example, the processing unit may evaluate the information included in a control message and may trigger a certain action within said node based on said control information, e.g. perform a control operation as instructed by the control information. Alternatively or in addition, the control message may be forwarded to an entity coupled with the network node and the respective control operation performed there.

Finally, the container may be optionally forwarded to a downstream node. Depending on the control message(s), the container may still include the control data portion or the control data portion is terminated (removed) within said node, i.e. the forwarded container does not comprise said control data portion any more. It is also possible that the control data portion is replaced with new control information, i.e. other control message(s) is/are included in the forwarded container. In a further variant, a new container may be generated including a header, the one or more data portions and the control data portion as explained above. The new container may then be transmitted to a downstream node.

Said method is advantageous because including the control message piggyback in the container payload is very resource efficient. In addition, the transmission of control message is very reliable because the reliability of the control message can be controlled independently from the data portion as it uses its own FEC which can be designed even more powerful than the FEC protecting the data portion. Further, the latency time between providing a control message at a certain node and control message transmission is short because the control message can be included in any container providing enough space for said control message transmission.

According to another aspect, a method for transmitting control messages in an optical transmission network is disclosed. The method comprises the following steps:

receiving at least one control message and optionally client data packets for insertion into a container from another client entity.

generating a container for transmission via an optical transmission link of the optical transmission network, the container comprising a container header and a container payload portion, wherein the container header comprises at least information regarding a destination node of the container and wherein the container payload portion includes one or more data portions comprising information associated with one or more client data packets and a control data portion associated with the at least one control message, the control data portion being associated with a forward error correction (FEC) information in order to protect the at least one control message against transmission errors.

sending the container to a downstream node in the optical transmission network.

According to embodiments, the container payload portion may comprise first FEC information associated with the control data portion and second FEC information associated with the one or more data portions, the first FEC information and the second FEC information being separate and independent. In other words, the container payload portion comprises a modular FEC design wherein the one or more data portions and the control data portion are covered by different FEC information. Thereby it is possible to decode the control data portion independent of the one or more data portions which enables an efficient control channel decoding because—for processing information of the control channel—not the whole container payload portion has to be decoded but only the control data portion (which is typically only a small fraction of the container payload portion).

According to embodiments, the container header may comprise information regarding the presence of a control data portion within the container payload portion. In other words, within the container header there may be an indicator which provides information whether a control data portion is included in the respective container or not. Based on said indicator it is possible to determine if a control data portion is present and has to be processed within the respective node. Said indicator is advantageous because the identification and processing of the control data portion can be improved.

According to embodiments, the container header may comprise information regarding the length of the control data portion included in the container payload portion. The control data length information may indicate the number of blocks covered by control message information or the number of bits/bytes used for transmitting control message information. Said control data length information may also provide information whether any control data portion is included in the control data portion at all. For example, a certain value of control data length information (e.g. value "0") may indicate that no control data length information in included in said container.

According to embodiments, the container header may comprise information regarding the length of the one or more data portions included in the container payload portion. For example, the one or more data portions may be arranged at the beginning of the container payload portion and the control data portion may start at the next free block or immediately after the one or more data portions. So, by evaluating information regarding the length of the one or more data portions it is possible to determine the beginning of the control data portion.

According to embodiments, the container header may comprise information regarding the position of the control data portion within the container payload portion, e.g. in the form of a dedicated header field. As mentioned before, said information regarding the position of the control data portion may be upper-mentioned information regarding the length of the one or more data portions (in case that the control data portion begins at the next free block or immediately after the one or more data portions), or may be a pointer or other reference indicating the beginning of the control data portion. Thereby, a quick locating of the control data portion within the container payload portion is possible.

According to embodiments, the container may comprise address information indicating the node to which the control data portion is directed to (in addition to the address information in the container header). Thereby, it is possible to route and transmit the control message to one or more nodes of the optical transmission network.

According to embodiments, said address information for the control data portion may be included in the control data portion. For example, the control data portion may comprise a header including said address information for the control messages. Thereby, each control data portion included in the container payload portion is directly associated with its address information.

According to other embodiments, said address information for the control data portion may be included in the container header, e.g. in the form of a dedicated header field carrying address information for the control data portion. Thereby, it is possible to determine the destination node of the control data portion by evaluating the container header which significantly reduces the processing effort for transmitting control data portions to their respective destination nodes.

According to embodiments, the destination node of the container may be different to the node indicated by said address information. In other words, the control message can be included in any container independent of its destination node (as long as the container is transmitted in a direction towards the node to which the control message should be provided).

According to embodiments, said address information for the control data portion may indicate that the control data portion is directed to a single node or multiple nodes. In other words, the control message may be singlecast, multicast or broadcast. Thereby, an efficient transmission of control messages can be obtained.

According to embodiments, the control data portion may be further included in the container as forwarded if said address information indicates that the control data portion is directed to another node or comprises a multicast or broadcast control message, or said control data portion is terminated in said node if said address information indicates that the control data portion is destined to said node. So, depending on the address information associated with the control data portion, the control data portion is removed out of the container, e.g. if the control data portion has reached a node indicated by the address information. In addition, the control data portion may be included in a subsequent container that is forwarded to a downstream node, in particular if said address information indicates that the control data portion comprises a multicast or broadcast control message. This may be necessary as processing of a multicast or broadcast control message may require some time on the local node. Such message is then queued again for further transmission in a following container after being processed.

According to embodiments, the container header may comprise information regarding occupied or unused capacity in the container payload portion. The information may be derived by evaluating length information associated with the one or more data portions and evaluating length information associated with the one or more control data portions. In other words, the occupied or unused capacity can be determined by summing up transmission capacity covered by the data portions and transmission capacity covered by control data portions. Based on said information regarding occupied or unused capacity (and using a given transmission capacity of a free container payload portion), it is possible to determine whether a further control data portion can be included in the container or not.

According to embodiments, the control data portion is transmitted sequentially from a node to the next adjacent downstream node in the direction to the node to which the control data message is directed. Thereby, a robust transmission of control messages is achieved independent of the configuration of the nodes and any malfunctions.

According to embodiments, the container payload portion is segmented into blocks of a certain length and said control data portion is included in one or more of said blocks. Preferably, all containers have a fixed length (e.g. in the range of 5000 bit to 15000 bit, preferably about 10000 bit). By means of said blocks, the container payload portion is structured, thereby facilitating the insertion of a control data portion in a non-occupied section of the container payload portion.

According to a further aspect, an apparatus to be included in an optical transmission network for transmitting control messages is disclosed. The apparatus comprises a first interface for receiving a container from an optical transmission link of the optical transmission network, the container comprising a container header and a container payload portion, wherein the container header comprises at least information regarding a destination node of the container and wherein the container payload portion includes one or more data portions comprising information associated with one or more client data packets and a control data portion associated with at least one control message, the control data portion being associated with a forward error correction (FEC) information in order to protect the at least one control message against transmission errors.

The apparatus may further comprise a decoder coupled with the first interface for decoding the control data portion using the FEC information to provide error detection and/or correction. The apparatus may further comprise a control unit to process decoded control messages included in the container. For example, the control unit may analyze address information associated with the control data portion in order to determine whether the control data portion is destined to the present node, has to be transmitted to a downstream node (transit control data portion), or both.

HI In addition, a second interface for providing the control message included in the decoded control data portion, and a third interface for forwarding the container to a downstream node, or generating a new container and forwarding the new container to a downstream node may be provided. The container may have been modified as explained above for the methods. In a similar way, the new container may be generated including the received data portions and the received control data portion if the address information for the control data portion indicates that the control data portion is directed to another node, or the control data portion comprises a multicast or broadcast control message. The received control data portion may be deleted if said address information indicates that the control data portion is directed to the present node and hence terminated. Alternatively, the control data portion may include one or more new control messages replacing the received control messages in the control data portion.

Furthermore, another apparatus to be included in an optical transmission network for transmitting control messages is disclosed. The another apparatus comprises: a first interface for receiving at least one control message. The first interface may further receive the client data packets for insertion into the container from another client entity coupled to the apparatus.

The another apparatus may further comprise a processor to generate a container for transmission via an optical transmission link of the optical transmission network, the container comprising a container header and a container payload portion, wherein the container header comprises at least information regarding a destination node of the container and wherein the container payload portion includes one or more data portions comprising information associated with one or more client data packets and a control data portion associated with the at least one control message, the control data portion being associated with a forward error correction (FEC) information in order to protect the at least one control message against transmission errors.

The another apparatus may further comprise a second interface for sending the container to a downstream node in the optical transmission network.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner. Further, if not explicitly indicated otherwise, embodiments of the invention can be freely combined with each other.

The invention is explained below in an exemplary manner with reference to the accompanying drawings, wherein FIG. 1 schematically illustrates an example diagram of an optical data transmission system including multiple nodes.

The present document refers to optical transmission systems, specifically to optical transmission systems for transmitting data packets (Ethernet, IP, fiber channel etc.) (e.g. Metro-Ethernet transport system). The optical transmission system may use containers comprising express headers for aggregating said data packets. Ethernet frames, for example, are aggregated in containers sorted by destination, which are forwarded or dropped in downstream nodes based on said express header which allows distinguishing between transit traffic and traffic destined for the local node without fully decoding the container. Intermediate nodes can also add data packets in flight to a transiting container, if it has enough space left. In this architecture, switching occurs at the lower optical layer and traffic forwarded from the optical layer to the switch/router is restricted to the packets destined for the local node. Traffic from the switch/router to the optical layer only comprises packets of which the local node is the source.

For a node wanting to transmit or forward a control message to a downstream node in the upper-mentioned Metro-Ethernet transport system, a possible solution would be to either use an entire transport container for transmission of control message, where it can set the destination address as needed, or to add the control message to a transit container which happens to have the desired destination address. But such a container would only randomly be available, and there are other drawbacks to using one of the two described options:

Using the standard data-plane transport mechanism for the exchange of control information relies on the functioning of the data plane, i.e. on a configured addressing scheme, nodes which function normally, and a working fairness algorithm, which allows every station to address a desired destination within a certain time boundary. A malfunctioning node could flood its downstream neighbors with its traffic and prevent them from accessing the shared medium. Hence, a channel which works under all circumstances and which allows maintaining remote control even in case of malfunctioning network equipment would be beneficial.

The probability to be able to board a transit container depends on the traffic scenario. In traffic scenarios with most of the traffic destined for one certain node, there will be very few transit containers with a destination other than said node.

A geographically distributed network requires a stronger control mechanism than a local Ethernet LAN in which loss of connectivity is eventually detected by the simple fact that the desired destination does not respond, and where support is available on site. Topology monitoring in metro networks is mandatory. Hello or keep-alive messages used for this purpose are short messages (typically encapsulated as 64-byte MAC frames), they must be sent periodically in short intervals and would leave a large part of a container empty, at least for the first part of the journey. Furthermore, with the data-plane encoding scheme, nodes add data to a transit container in rather large units of e.g. 1250 bytes, which is nearly 20 times the message size and would cause even more stranded bandwidth in the container. In addition, the time to deliver the message would be random, a certain response time could not be guaranteed. Another option would be to send the container to a group address, so that downstream stations could add their own control messages. But control messages are generated individually, and the likelihood, that a downstream station has generated an event at the same time is small. In addition, containers addressed to a group address should only be erased by the source station in a ring, or by the end station on a bus, to make sure that it has reached all nodes. Hence it would occupy channel bandwidth for a full round trip even if it was only destined for the downstream neighbor.

An alternative solution would be to establish a separate wavelength for the control channel, similar to the Optical Supervisory Channel (OSC) in the Optical Transport Network (OTN). For this solution, however, reserved spectrum and an additional line termination would be needed. And since such a control channel does not share fate with the data bearer, hello or keep-alive messages generated by higher protocol layers and transmitted on the control channel would not detect failures in the data-channel or in the data-channel transponders, therefore higher protocol layers need to be informed by the generation of explicit control messages to learn about such a state.

In the following, an improved method and an apparatus for providing a control channel within an optical transmission system is described in closer detail.

In a broad sense, a method for transmitting control messages is proposed in which the control channel is established piggyback on the data-plane transport signal. Control messages are extractable and decodable independently from the remaining part (specifically, data portions comprising client data packets) of the container payload to avoid having to decode the container data. Therefore, a separate FEC encoding/decoding engine is used. The control data portion, in the following also referred to as Control Payload (CP) is placed within the container using only a fraction of the free space of the container payload. In contrast to an approach which uses the data-plane encoding/decoding, the CP is not limited to containers with a particular destination address, but can be added to any transit container which provides enough space. Thereby, nodes have more opportunities to transmit their control information, and the control channel is more calculable. The resulting control channel is equivalent to a chain of point-to-point connections which are terminated in the next downstream node which then forwards the CP if the destination is further downstream. This makes it unnecessary to specify a destination address and the control channel works also with non-configured nodes without any transport-layer addressing scheme. The proposed approach is perfectly suitable for hello or keep-alive messages or the flooding mechanism used by link-state protocols to propagate topology information, or for e.g. continuously reporting the quality of the received signal to an upstream node.

Control messages can have fixed or variable length. Longer and fixed messages have better FEC efficiency. Depending on the minimum message size to be supported, estimates for forward error correction (FEC) overhead are in the range of 300% overhead (e.g. 64 byte message) or better to achieve data-plane-FEC performance. This is much more efficient than the $20x$ needed container space using the FEC scheme for data-plane encoding. However, it could be an asset to use part of this gain to increase the reliability of the control channel, so FEC overhead could be used as a steering parameter for control-channel reliability.

Such a control channel is a universal transport mechanism, but it is especially advantageous for short and/or periodical messages (e.g. hello, statistics reporting), messages between direct neighbours (e.g. reporting the quality of the received signal to an upstream neighbour), and multicast/broadcast messages which need to pass by all nodes.

The virtual control channel provided by including control messages into the container payload is tolerant to unfair access to the shared medium caused by misbehavior of the fairness mechanism or misconfiguration because it does not depend on the availability of a particular container (address) and to failures of the data-plane encoding/decoding engine. It could even be used simultaneously with the transporting of other, possibly longer control messages through the data-plane FEC (e.g. to transport only short messages or act as a primary/backup channel).

The sender could then decide which channel to choose depending on its preferences.

Downstream nodes need to be informed about the presence and position of the CP. Multiple scenarios are conceivable: (1) The CP is present at a fixed position in the free space of the container (e.g. at the end) and has either a fixed length, or a variable length which must be indicated in the container header, or (2) CP is inserted at a variable position in the free space, e.g. at the beginning of the free space after the data payload, and has fixed or variable length.

In a preferred embodiment, the CP is appended to the data payload and has variable length to avoid stranded bandwidth caused by fixed-size control payload. A field in the header (CP-LEN) indicates the presence and length of the respective CP. A CP can, but need not be present in a container. A CP-LEN value of 0 means that the container contains no control information, otherwise the CP-LEN value specifies the length. Since the CP is appended to the data payload and is not covered by the LEN field indicating the length of the data portions comprising client data packets (i.e. from the data payload point of view, it can be looked at as part of the free space), the data-message encoder can consider the control payload to be all zeros, hence data encoding and control encoding do not interfere with each other.

In the following, embodiments of the method for providing control messages to one or more nodes included in an optical transmission network, respectively, an apparatus included in the optical transmission network for processing control messages included in transmitted containers are disclosed in closer detail.

Figure 1:
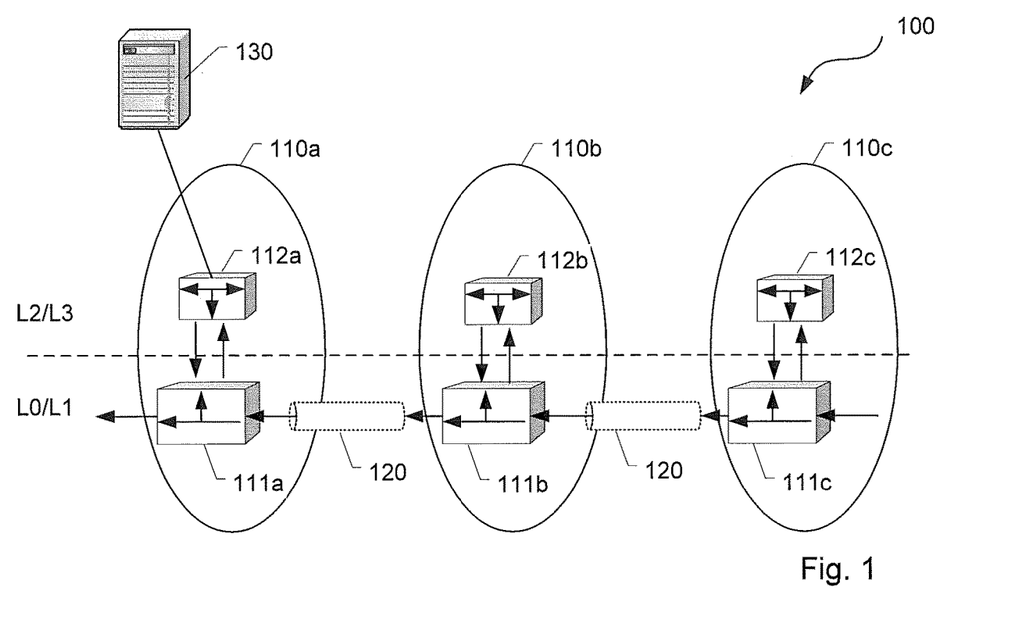

FIG. 1 schematically illustrates an example architecture of an optical transmission system 100. The architecture comprises multiple nodes 110a, 110b, 110c which are interconnected by optical transmission links 120. The optical transmission links 120 may be optical fibers. The optical transmission system 100 may be adapted to support WDM, i.e. the information may be transmitted through the optical transmission system 100 using multiple different wavelengths. Each node 110a, 110b, 110c or a subset of nodes 110a, 110b, 110c may comprise a data processing entity 111a, 111b, 111c. Said data processing entity 111a, 111b, 111c may be included in the optical transmission layer (L0/L1 according to OSI-model), i.e. may be coupled with one or more optical transmission links 120. Each data processing entity 111a, 111b, 111c may be coupled with a switching or routing device 112a, 112b, 112c included in an upper network layer (e.g. layers L2/L3 of the OSI-model). The switching or routing device 112a, 112b, 112c may be adapted to receive data from its corresponding data processing entity 111a, 111b, 111c. For example, said data may be routed by the data processing entity 111a, 111b, 111c to the switching or routing device 112a, 112b, 112c in order to forward said data to a client entity 130 coupled with the switching or routing device 112a, 112b, 112c. In the opposite direction, the switching or routing device 112a, 112b, 112c may receive data packets from a client entity 130 in order to transmit said data packets via the optical transmission system 100.

More precisely, data packets (specifically Ethernet or IP packets) from a client switching or routing device 112a included in the upper network layer are received by the optical node 111a. The optical node 111a is connected to a shared, bidirectional, optical transmission media providing a synchronous bit stream at a rate in the order of Terabit/s to which also other optical nodes 111b, 111c are connected. The optical node 111a transmits packets to these other nodes via one direction of this transmission media. In the same way, the optical node may receive packets from the other nodes in the network via the other direction of the transmission media. The optical node 111a acts as forwarder between its attached upper layer device 112a and remote upper-layer devices 112b, 112c via its remote optical peer nodes 111b, 111c.

In other embodiments, client entity 130 (e.g. a server computer or a personal computer) is directly coupled with a switching entity 111a, 111b, 111c and generates Ethernet packets (i.e. client data) for transmission over the optical network. These Ethernet packets may be inserted by the node 111 into a transit container as described above. Further, the client entity 130 may receive Ethernet packets from the node 111, the Ethernet packets received in a container at the node being the destination of the container.

Figure 2:
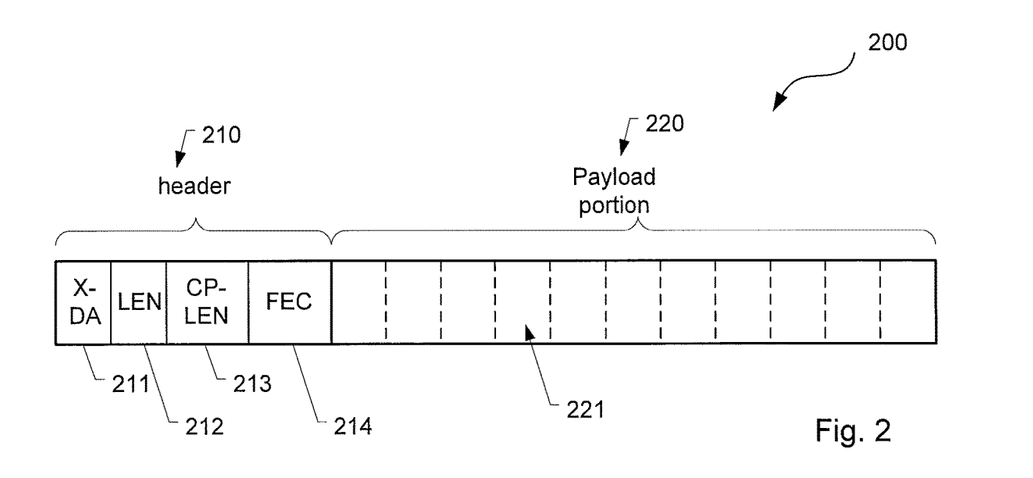
FIG. 2 schematically illustrates the structure of a container adapted for an aggregated transmission of data packets.

FIG. 2 shows an example embodiment of a container 200 to be transmitted in the optical transmission system 100 according to the present proposal. The container 200 comprises a container header 210 and a container payload portion 220. In order to save interface resources and processing resources at the switching or routing devices 112a, 112b, 112c, the containers 200 transmitted between the switching entities 111a, 111b, 111c comprise a container header 210, the container header 210 including information regarding a destination node of the container 200. According to an embodiment, the container header 210 comprises a reduced number of bits, e.g. 40 to 70 bits, preferably 50 to 60 bits in order to be processed quickly. For example, the container header 210 may comprise a first header section 211 comprising destination node address information (X-DA). Destination node address information indicates that all client data packets included in the container 200 are directed to a node 110a, 110b, 110c associated with said destination node address information. When passing a certain data processing entity 111a, 111b, 111c, the destination node address information is analyzed in order to be able to decide whether client data packets received at the node 110a, 110b, 110c including said switching entity 111a, 111b, 111c are directed to said destination node, or whether client data packets directed to the identified destination node can be included in said container 200. So, in other words, based on the destination node address information each container 200 passing a node 110a, 110b, 110c can be categorized in "transit" (forwarding the container further downstream) or "local" (container is destined to the present node).

Containers can carry data packets with different IP or Ethernet destination addresses, all of them reachable via the same destination node. Constrained by the limited size of the container header, node addresses may be shorter than IP addresses or Ethernet addresses, typically in the range of 1 byte. By means of signaling, a mapping table may be established to obtain the destination node address for a certain IP or Ethernet destination address.

Furthermore, the container header 210 may comprise a second header section 212, said second header section 212 comprising information being indicative for the capacity of the container payload portion 220 occupied by client data packets (LEN) (in the following referred to as data portion length). In case that the container payload portion 220 is segmented in a plurality of blocks 221 having equal length, the second header section 212 may indicate the number of blocks 221 occupied by a data portion comprising said client data packets. Preferably, each container has a fixed transport capacity within the container payload portion, for example, a fixed number of blocks of equal length.

In addition, the container header 210 may comprise a third header section 213, said third header section 213 comprising information regarding the length (CP-LEN) of the control data portion included in the container payload portion 220 (in the following referred to as control data portion length). For example, the length information may indicate the number of blocks occupied by the control data portion. Also other length indications may be possible (e.g. number of bits/bytes of the control data portion etc.). The length information may be also used as an indicator whether the container payload portion 220 comprises a control data portion at all. For example, a certain value (e.g. value 0) of length information may be used to indicate that there is no control data portion included in the container payload portion 220. As already mentioned before, by including a control data portion into the container payload portion 220, control information can be exchanged between the nodes 110a, 110b, 110c without establishing a separate control channel, i.e. all communication is provided through the same signal path by including the client data packets as well as control messages into the containers 200.

Finally, the container header 210 may comprise a fourth header section 214, said fourth header section 214 comprising FEC information. The FEC information included in the container header 210 may only refer to information included in the container header 210, i.e. in case of transmission errors, the container header information can be recovered by using said FEC information. In other words, the container 200 is protected against transmission errors using a modular FEC configuration, said modular FEC configuration using first FEC information referring only to the container header 210 and at least a second FEC information referring only to the client data packets included in the container payload portion 220. The first FEC information and the second FEC information are separate and independent.

Said upper-mentioned container header 210 is adapted to be decoded in real-time by an intermediate node arranged between the source node and the destination node in order to determine the destination node of the container 200. Depending on said information, the intermediate node is able to determine whether client data packets included in the container payload portion 220 are destined to said intermediate node or the container 200 has to be transmitted further downstream (transit container).

In addition, the data processing entity 111*a*, 111*b*, 111*c* included in the intermediate node may be adapted to decide whether client data packets received at said intermediate node (e.g. from a client data entity 130 coupled with said intermediate node via upper network layers) for transmission via the optical transmission network should be included in said container 200 destined to a certain destination node and whether free capacity of the container payload portion 220 is sufficient for transmitting at least a portion of said received client data packets.

Finally, the data processing entity 111*a*, 111*b*, 111*c* included in the intermediate node may be adapted to decide based on said data portion length (LEN) information and said control data portion length information whether there is free capacity within the container payload portion 220 for transmitting one or more further control data portions (e.g. provided by an intermediate node).

As shown in FIG. 2, the container 200 is divided into header and payload. Header and payload may be modulated with a different modulation format. For example, the modulation format of the header may be extremely robust against transmission errors (e.g. 4-PSK DP) and may have a strong Forward Error Correction (FEC) to guarantee secure decoding, while for the payload a more efficient modulation format is chosen (e.g. 32-QAM-DP). Further details on the modulation and transmission schema for containers are disclosed in previous European patent application EP15305633.8 filed on Apr. 24, 2015 which is incorporated in reference in its entirety.

Figure 3:
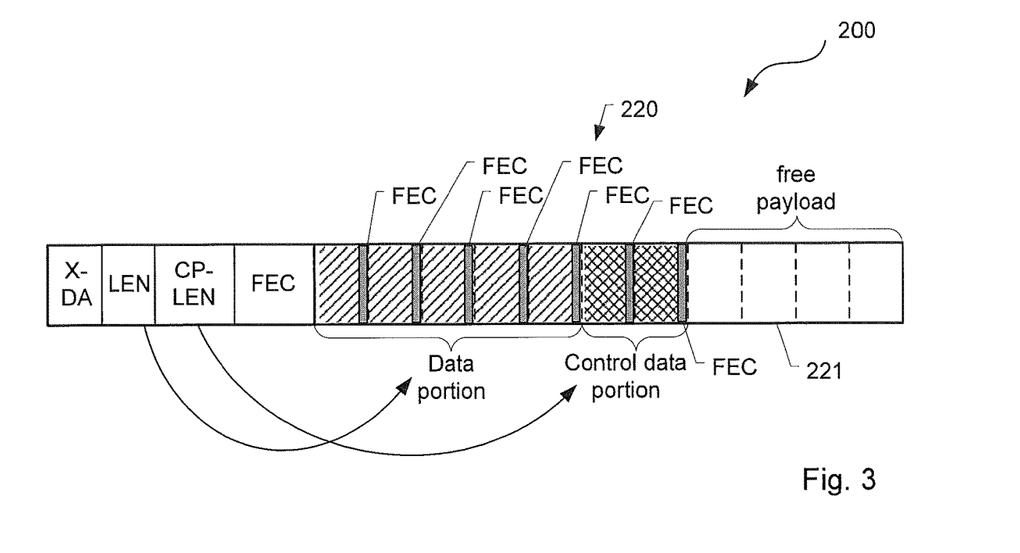
FIG. 3 schematically illustrates the structure of a container including a data portion and a control data portion.

FIG. 3 illustrates an example embodiment of a container 200 including a data portion in a first section of the container payload portion 220 and a control data portion in a second section of the container payload portion 220. The data portion as well as the control data portion may be distributed over multiple blocks 221 of the container payload portion 220.

As described before and indicated by the arrows, the length information included in the container header 210 refer to different sections within the container payload portion 22 and are separate and independent, namely, the data portion length information (LEN) to the section of the container payload portion 220 including the one or more data portions, and the control data portion length information (CP-LEN) to the section of the container payload portion 220 including the one or more control data portions. In other words, the control data portions are not covered by the data portion length information (LEN) and vice versa. Thereby, based on the data portion length information (LEN), the one or more data portions can be decoded without considering the control data portion (e.g. considered by the data portion decoder as zeros) and vice versa. In other words, the data portions and the control data portions can be decoded independently.

Based on said data portion length information (LEN) and said control data portion length information (CP-LEN), it is possible to investigate the free transport capacity of the container 200 in order to determine whether further client data packets and/or control information can be included in the container payload portion 220. The container 200 may have a fixed transport capacity and the free transport capacity may be derived by subtracting the occupied capacity from the container transport capacity.

Furthermore, the container payload portion 220 comprises a modular FEC design. Within the container payload portion 220, at least a first FEC information is included, said first FEC information being associated with the one or more data portions for protecting the client data packets included in the data portion against transmission errors. In addition, also a second FEC information is included in the container payload portion 220, the second FEC information referring to the control data portion in order to protect the control message against transmission errors. Based on said different and independent FEC information, the control data portion can be decoded independently (without decoding the one or more data portions) and vice versa. It is worth mentioning that the control data portion can be extracted from the container payload portion independent of the data portion. Thereby, the processing of the control message can be decoupled from the processing of the client data packets included in the data portion.

As already mentioned before, control data portions can have a fixed or variable length. The overhead caused by the FEC information associated with the control data portion increases with a decreasing length of the control data portion. Control data packets used for transmitting control messages are typically small compared to the packet sizes of the client data packets to be transmitted. By covering the data portions and the control data portions using different FEC schemes, the FEC overhead caused by FEC-coding of said control data portion can be significantly decreased.

The container 200 may comprise address information indicating the destination node to which the control data portion is destined. Control messages may be singlecast (one destination node), multicast (multiple destination nodes) or broadcast (destined to all nodes of the optical transmission network). The address information may be included in the container header 210. Preferably, the address information for the control data portion may be included in the container payload portion 220 and may be transmitted in association with the control data portion to which the address information belongs to. For example, the control data portion may comprise a header in which the address information for the control data portion is included. Based on said address information it is possible to determine whether the control data portion is directed to the node in which the container 200 is actually processed or whether the control data portion is destined to a downstream node.

Preferably, the control data portion can be included in any container 200 which provides enough transmission capacity independent of its destination node as long as the container 200 is transmitted in the direction of the node 110*a*, 110*b*, 110*c* to which the control data portion has to be transmitted. In other words, the one or more user data portions included in the container payload portion 210 can be addressed to a destination node (indicated by the address information (X-DA) in the container header) which is different to the node to which the control data portion is destined.

Preferably, the address information associated with the control data portion is evaluated in each node 110*a*, 110*b*, 110*c* through which the container 200 is transmitted. For example, a virtual control channel between the nodes 110*a*, 110*b*, 110*c* may be established by a node-wise transmission of the control data portion to its destination node. After receiving the container 200 including the control data portion at a certain node 110*a*, 110*b*, 110*c*, the address information may be investigated in an evaluation unit in order to decide whether the destination node of the control data portion is reached or not. If not, the control data portion is transmitted to the next downstream node 110*a*, 110*b*, 110*c*. Otherwise, the control data portion is processed in the present node 110*a*, 110*b*, 110*c*. In case of a multicast or broadcast control message, the message can both be processed and transmitted to the next downstream node.

Figure 4:
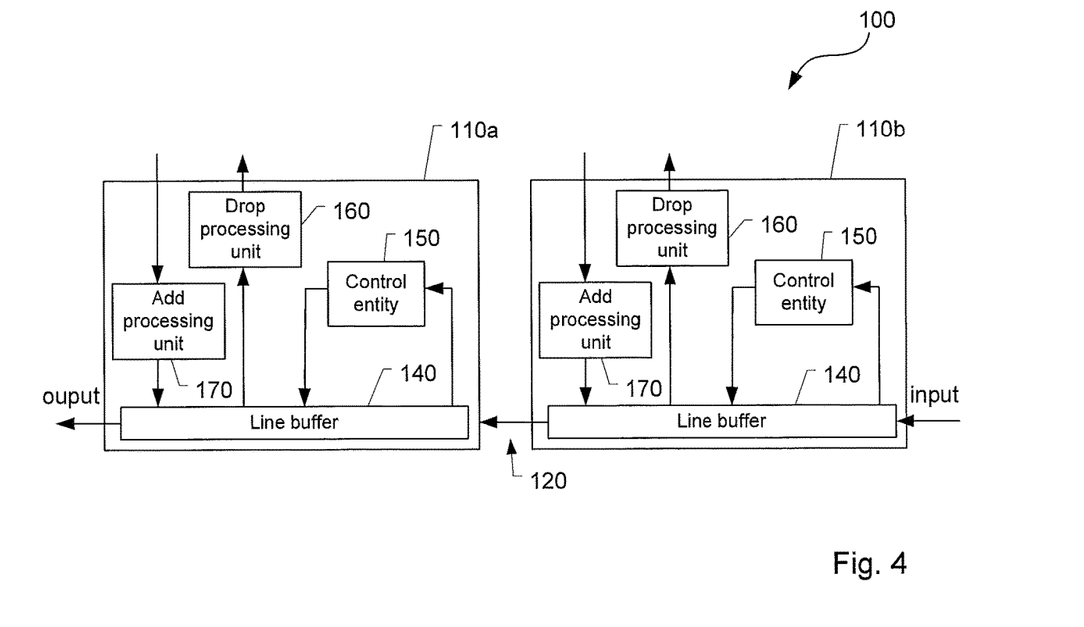
FIG. 4 schematically illustrates the basic architecture of nodes being adapted to process control messages included in the transmitted containers.

FIG. 4 shows a schematic block diagram of the optical transmission system 100 illustrating the functional architecture of the nodes 110*a*, 110*b*. Each node 110*a*, 110*b* comprises a line buffer 140 for buffering the containers 200 received from the respective optical transmission link 120. The line buffer 140 may be adapted to buffer information included in the respective container 200 in the electrical domain for further processing. Each node 110*a*, 110*b* may comprise a control entity 150 configured to process control messages included in the container 200. For example, the control entity 150 may receive a copy of the control data portion(s) included in the container 200 at its input and may perform a decoding of the control data portion(s) using corresponding FEC information. In addition, the control entity 150 may be adapted to evaluate information included in the control data portion and—if the present node 110*a*, 110*b* is the destination node of the control data portion-process the control message included in the control data portion. In addition, the control entity 150 may be adapted to provide a new control data portion for transmission to one or more destination nodes.

It is worth mentioning that the control entity 150 may be configured to update the control portion length information and the FEC information included in the container header 210 in order to adapt information of the container header 210 to the information included in the container payload portion 220.

In addition, the nodes 110*a*, 110*b* may comprise a drop processing unit 160 adapted to decode a data portion of the container 200 if the destination node address information (X-DA) of the container 200 indicates that the at least one data portion included in the container 200 is destined to the current node 110*a*, 110*b*. The decision whether the container 200 has arrived at the destination node or not can be made by evaluating the container header 210 without fully decoding the container 200. Due to the independent FEC coding of the container header 210, it is possible to only decode the container header 210 (which is preferably a short header, e.g. 50-60 bit) in order to determine the destination node of the container 200 and decide whether the container 200 is a transit container or the client data packets included in the container 200 are directed to the present node 110*a*, 110*b* and have to be decoded by the respective drop processing unit 160. It is worth mentioning that the drop processing unit 160 may be configured to update the data portion length information and the FEC information included in the container header 210 in order to adapt information of the container header 210 to the information included in the container payload portion 220.

Furthermore, the nodes 110*a*, 110*b* may comprise an add processing unit 170. The add processing unit may receive (e.g. via higher network layers) client data packets form a client data entity 130 which should be transmitted via the optical transmission network to a downstream node. The add processing unit 170 may be adapted to investigate to which node the client data packets are destined to (e.g. based on the IP address of the client data packets). Based on the determined node address, the add processing unit 170 is adapted to encode the client data packets (FEC-coding) and insert a data portion representing the encoded client data packets (including FEC information associated with said client data packets) into a container destined to the node 110*a*, 110*b*, 110*c* to which the client data packets should be transmitted. It is worth mentioning that the add processing unit 170 may be configured to update the data portion length information and the FEC information included in the container header 210 in order to adapt information of the container header 210 to the information included in the container payload portion 220.

Figure 5:
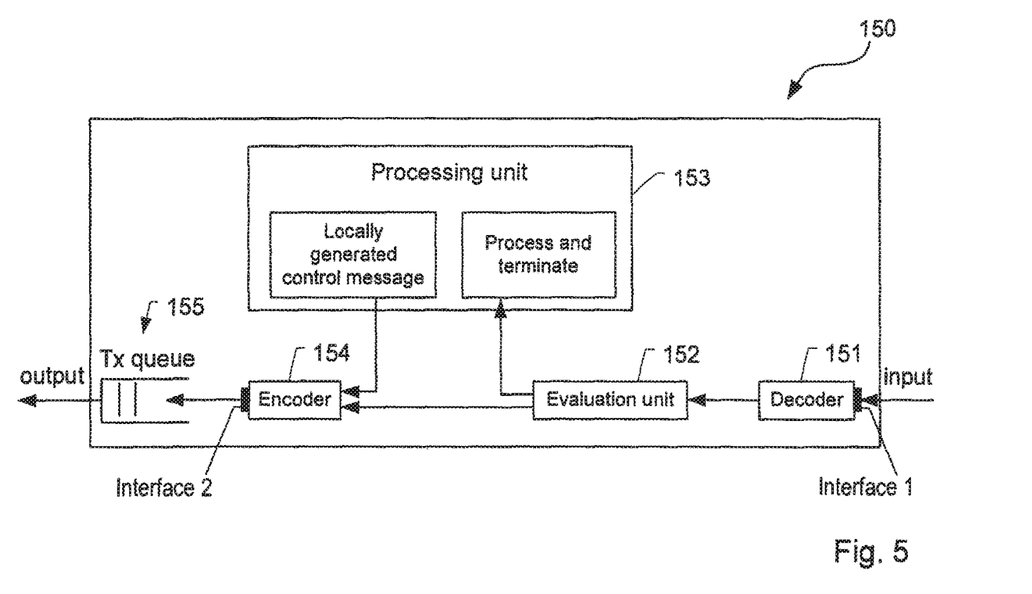
FIG. 5 schematically illustrates a block diagram of the architecture of a control unit included in the node.

FIG. 5 shows a schematic diagram of the control entity 150 included in a node 110*a*, 110*b*, 110*c* in greater detail. At the input of the control entity 150, a copy of the control data portion may be received. According to other embodiments, the whole container 200 or data included in the container payload portion 220 may be received at the input.

The input may be coupled with a decoder 151. The decoder 151 may receive the control data portion or may extract the control data portion out of the container 200 or out of the container payload portion 220. The decoder 151 may be configured to decode the control data portion based on FEC information associated with said control data portion. Thereby, possibly occurred transmission errors are remedied.

Said decoder 151 may be coupled with an evaluation unit 152. The decoded control data portion is provided by the decoder 151 to the evaluation unit 152 in order to evaluate data included in the control data portion. More in detail, the evaluation unit 152 may be adapted to analyze address information associated with the control data portion in order to determine whether the control data portion is destined to the present node (in which the control entity 150 is included), has to be transmitted to a downstream node (transit control data portion), or both.

Furthermore, the evaluation unit 152 may be coupled with a processing unit 153. In case that address information associated with the control data portion indicates that the control data portion is destined to the present node 110*a*, 110*b*, 110*c*, the control data portion or information included in said control data portion is provided to said processing unit 153. The processing unit 153 may process the control message included the control data portion. For example, the processing unit 153 may trigger certain actions based on the control message included the control data portion. In addition, the processing unit 153 may terminate the control data portion and trigger one or more actions based on the control message included in the control data portion.

The evaluation unit 152 may also be coupled with an encoder 154. In case that the address information associated with the control data portion indicates that the control data portion has to be transmitted to a downstream node, the encoder 154 may be adapted to encode the control data portion e.g. by generating new FEC-information, thereby reversing the action provided by the decoder 151 and prepare the control data portion for further transmission.

In addition, the encoder 154 may be also coupled with the processing unit 153. The processing unit 153 may be adapted to create a new control message or receive a new control message from a further entity included in the node 110a, 110b, 110c. Said new control message may be provided to the encoder 154 in order to apply a FEC coding to said new control message.

The output of the encoder 154 may be coupled with a TX queue 155, said TX queue 155 buffering control data to be transmitted in containers 200 of the optical transmission system 100. It is worth mentioning that control data included in the TX queue 155 can be included—as already mentioned before—in any container 200 which provides enough transmission capacity independent of the container's destination address as long as the respective container 200 is transmitted in the direction towards the node to which the control message should be transmitted.

According to an embodiment, the control unit 150 may also comprise an RX-queue at the input of the control unit 150 in order to buffer control data received at the input, specifically, in order to cope with multiple control data received in a short period of time.

The processing of the control unit 150 may be decoupled from the bit rate of the optical transmission system, i.e. the processing of the control unit 150 may be performed with a lower bit rate than the bit rate of the optical transmission system which reduces the processing requirements of the control unit 150.

Figure 6:
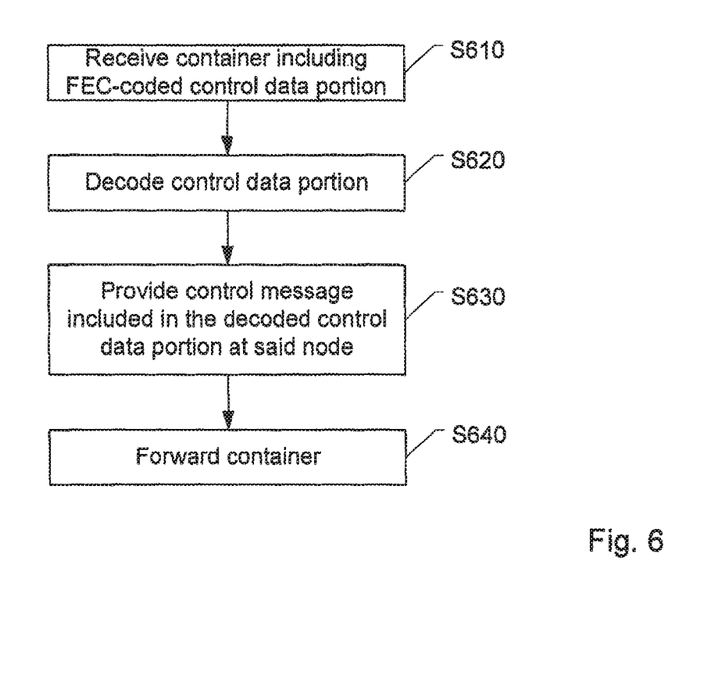
FIG. 6 schematically shows a flow chart illustrating the method steps for providing control messages within the optical transmission network.

FIG. 6 shows a flow chart of a method for providing control messages to one or more nodes 110a, 110b, 110c included in the optical transmission network.

First, at a node 110a, 110b, 110c, a container 200 comprising a container payload portion 220 including one or more data portions and a control data portion may be received (S610). The control data portion may be associated with a control message to be provided within the optical transmission network. Furthermore, the control data portion may be associated with forward error correction (FEC) information in order to protect the control message against transmission errors.

After receiving the container payload portion 220 including the control data portion, the control data portion is decoded using said FEC information to provide error detection/correction, thereby obtaining a decoded control data portion (S620).

After the decoding step, the control message included in the decoded control data portion is provided at said node (S630). More in detail, the node may process the control message and trigger an action based on information included in the control message.

The container 200 which included the control data portion is then forwarded to a downstream node (S640). The forwarded container may comprise the control data portion if the control message is a multicast or broadcast control message (also addressed to further nodes). In addition, the forwarded container may comprise another control data portion provided by the present node and comprising information regarding another control message which has to be transmitted to a downstream node.

Figure 7:
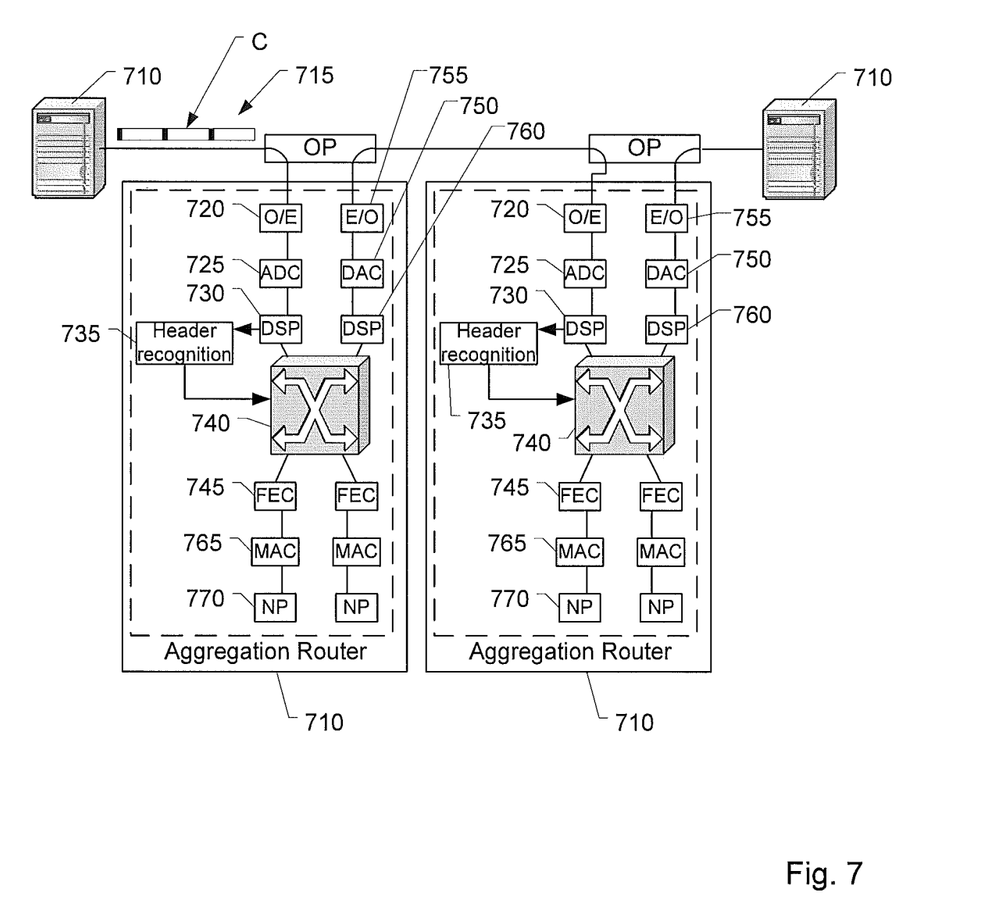
FIG. 7 schematically illustrates an example application of the proposed method and an example architecture of disclosed nodes.

FIG. 7 shows an example application of the proposed method in an Optical Ethernet Bus with four nodes 710 and a zoom-in on two middle nodes 710 to describe the node architecture in detail. The optical Ethernet bus is a shared medium operating in time multiplex and allows transmission of containers between arbitrary pairs of bus participants (nodes) without the need for setting up explicit connections. The shared medium is based on point-to-point fiber links between respective two adjacent nodes. The optical Ethernet bus can be single-wavelength, but is typically a Wavelength Division Multiplex (WDM) system carrying a synchronous, digital container structure 715. This container structure may be fundamentally different from known technologies like SDH or OTH. As shown in FIG. 2, the container C is divided into header and payload. Header and payload may be modulated with a different modulation format. For example, the modulation format of the header is extremely robust against transmission errors (e.g. 4-PSK DP) and may have a strong Forward Error Correction (FEC) to guarantee secure decoding, while for the payload a more efficient modulation format is chosen (e.g. 32-QAM-DP). Further details on the modulation and transmission schema for containers are disclosed in previous European patent application EP15305633.8 filed on Apr. 24, 2015 which is incorporated in reference in its entirety.

Said two intermediate nodes 710 may each comprise an aggregation router. Within said aggregation router, a received optical signal is converted from the optical domain into the electrical domain (O/E converter 720) and converted from the analog domain in the digital domain (A/D converter 725). Symbols of the applied modulation schema and corresponding digital data are reconstructed by digital signal processor (DSP 730). A header recognition and decoding entity 735 examines the received and reconstructed digital container header in real time and decides whether to forward the container C downstream (to the following node 710) or hand it over to decoding block (FEC 745) which recovers the container content and delivers it to a client MAC unit 765.

Note that the scenario shown in FIG. 3 assumes that the OE interface (comprising all blocks from FEC 745 to the optics plug OP) is part of a router line card and the Ethernet MAC (Media access control) layer of a router is the client transmitting and receiving Ethernet packets to/from the transmission part. The optics plug OP may be an electro-mechanical connector which bypasses the node when the plug is removed, i.e. it connects incoming line to outgoing line, and which puts the node 710 in between incoming and outgoing line when the plug is inserted. This is to keep the optical bus working if a node is added or removed. Another implementation option would be to have the functional blocks split through the MAC layer in two devices: an optical access device with all blocks except network processor (NP 770), and a router line card with NP and MAC, the MAC layers of both devices connected via an Ethernet interface. The blocks of the OE interface are typically implemented in an ASIC. The network processor 770 may be a programmable device optimized for processing network data packets. Specifically, it may be designed to handle tasks commonly associated with the upper layers of the seven-layer OSI networking model such as header parsing, pattern matching, bit-field manipulation, table look-ups, packet modification, and data movement. The network processor 770 may in particular process the stack of the protocol used by the client data/packets, e.g. Ethernet or IP and may perform format conversion, etc. One or more client entities 130 (not shown in FIG. 3) acting as source of destination of client data may be coupled with node 710.

It must be noted that the payload of a received container is only decoded if the container C is destined for the local router MAC. If it is a transit container, the payload is never handed over to the local FEC entity 745, instead the switching block 740 performs a bypassing of the container C, i.e. the container C is not decoded in the local decoding stack but is reconverted from digital to analog (DAC-block 750) and from electrical to optical (E/O converter 755) and immediately forwarded.

Summing up, a method and apparatus for transmitting control messages in an optical transmission system 100 have been disclosed. It is considered that transporting control messages in the data payload space of a container is advantageous because it does not require a separate spectrum and line termination of an optical supervisory channel (OSC)-like solution and because it follows the Ethernet paradigm that all communication is transmitted through the same signal path.

With upper-mentioned separate FEC encoding, control messages have better transmission opportunities because they can board any container, hence communication is more calculable and independent of traffic patterns. The separate FEC is more efficient for control messages than the data-plane FEC because it can be tailored to smaller message sizes and leaves less stranded bandwidth in the containers. The saved bandwidth can be used for transporting other information or it can be exploited to increase the reliability of the control channel by deliberately increasing control-FEC overhead, e.g. 400% or 500% instead of 300%, which allows correcting more failures. A highly reliable control channel would be an asset.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, the explicit use of the term "processor" or "computer" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and non-volatile storage. Other hardware, conventional and/or custom, may also be included.

The invention claimed is:

1. A method, comprising:
   receiving, at a node in an optical transmission network, a container comprising a container header and a container payload portion, wherein the container header comprises at least information regarding a destination node of the container, and wherein the container payload portion includes one or more data portions comprising information associated with one or more client data packets and a control data portion, the control data portion being associated with one or more control messages and a forward error correction (FEC) information to protect the one or more control messages against transmission errors;
   decoding the control data portion taking into account the FEC information, wherein a destination address of the control data portion and a destination address of the destination node of the container are separate;
   in a condition of the destination address of the control data portion being said node, providing the one or more control messages included in the decoded control data portion to a higher protocol layer processing at said node; and
   in a condition of the destination node of the container being another node coupled with said node, forwarding the container to a downstream node.

2. The method according to claim 1, wherein the container payload portion comprises first FEC information associated with the control data portion and second FEC information associated with the one or more data portions.

3. The method according to claim 1, wherein the container header comprises information that indicates a presence of a control data portion within the container payload portion.

4. The method according to claim 1, wherein the container header comprises information regarding a length of the control data portion included in the container payload portion.

5. The method according to claim 1, wherein the container header comprises information regarding a position of the control data portion within the container payload portion.

6. The method according to claim 1, wherein the container comprises address information indicating the node to which the control data portion is directed.

7. The method according to claim 6, wherein said address information is included in the control data portion, or said address information is included in the container header.

8. The method according to claim 6, wherein the destination node of the container is different to the node indicated by said address information.

9. The method according to claim 6, wherein said address information indicates that the control data portion is directed to a single node or multiple nodes, and wherein said container is forwarded to a downstream node, said control data portion being included in the forwarded container or a following container.

10. The method according to claim 6, wherein said container is forwarded to the downstream node, said control data portion being included in the forwarded container in the condition of said address information indicates that the control data portion is not destined to said receiving node.

11. The method according to claim 6, wherein said container is forwarded to the downstream node, said control data portion is terminated in said node in the condition of said address information indicates that the control data portion is destined to said receiving node.

12. The method according to claim 1, wherein the container header comprises information that indicates occupied or unused capacity in the container payload portion.

13. The method according to claim 1, wherein the control data portion is transmitted sequentially from a node to an adjacent downstream node in the direction to the node to which a control data message is directed.

14. An apparatus for an optical transmission network, for transmitting control messages, the apparatus comprising:
- a first interface adapted to receive a container from an optical transmission link of the optical transmission network, the container comprising a container header and a container payload portion, wherein the container header comprises at least information regarding a destination node of the container, and wherein the container payload portion includes one or more data portions comprising information associated with one or more client data packets and a control data portion associated with at least one control message, the control data portion being associated with a forward error correction (FEC) information to protect the at least one control message against transmission errors;
- a decoder coupled with the first interface, the decoder being adapted to decode the control data portion using the FEC information, wherein a destination address of the control data portion and a destination address of the destination node of the container are separate;
- an evaluation unit that in a condition that the destination address of the control data portion is said apparatus is adapted to provide the at least one control message included in the decoded control data portion to higher protocol layer processing;
- a second interface that in a condition that the destination node of the container is another node coupled with said apparatus is adapted to forward the container to a downstream.

15. An apparatus for an optical transmission network, for transmitting control messages, the apparatus comprising:
- a first interface adapted to receive at least one control message;
- a processor adapted to generate a container for transmission via an optical transmission link of the optical transmission network, the container comprising a container header and a container payload portion, wherein the container header comprises at least information regarding a destination node of the container, and wherein the container payload portion includes one or more data portions comprising information associated with one or more client data packets and a control data portion associated with the at least one control message, wherein a destination address of the control data portion and a destination address of the destination node of the container are separate, the control data portion being associated with a forward error correction information to protect the at least one control message against transmission errors; and
- a second interface adapted to send the container to a downstream node in the optical transmission network.

16. The method according to claim 1, wherein at least one of the one or more control messages performs a control operation at the destination address of the control data portion as instructed by control information.

17. The method according to claim 2, wherein the one or more control messages associated with the control data portion are extractable and decodable independently from the one or more data portions.

18. The method according to claim 16, wherein the control operation comprises a hello-message or a keep-alive message.

19. The method according to claim 1, wherein the control data portion comprises a header in which the destination address for the control data portion is included.

20. The method according to claim 1, wherein other control message(s) is/are included in the forwarded container.

* * * * *

UNITED STATES PATENT AND TRADEMARK OFFICE
CERTIFICATE OF CORRECTION

PATENT NO. : 10,727,978 B2
APPLICATION NO. : 15/762306
DATED : July 28, 2020
INVENTOR(S) : Ulrich Gebhard et al.

It is certified that error appears in the above-identified patent and that said Letters Patent is hereby corrected as shown below:

In the Claims

In Claim 14, Column 19, Line 36, after "downstream" insert --node--.

Signed and Sealed this
Twenty-second Day of September, 2020

Andrei Iancu
*Director of the United States Patent and Trademark Office*